Jan. 14, 1969　　　ISAMU KUBOTA　　　3,421,812
AUTOMATIC EXPOSURE CONTROL MOTION PICTURE CAMERA
Filed Feb. 24, 1966　　　　　　　　　　　　　　Sheet 1 of 2

INVENTOR
ISAMU KUBOTA
BY Stanley Walder
ATTORNEY

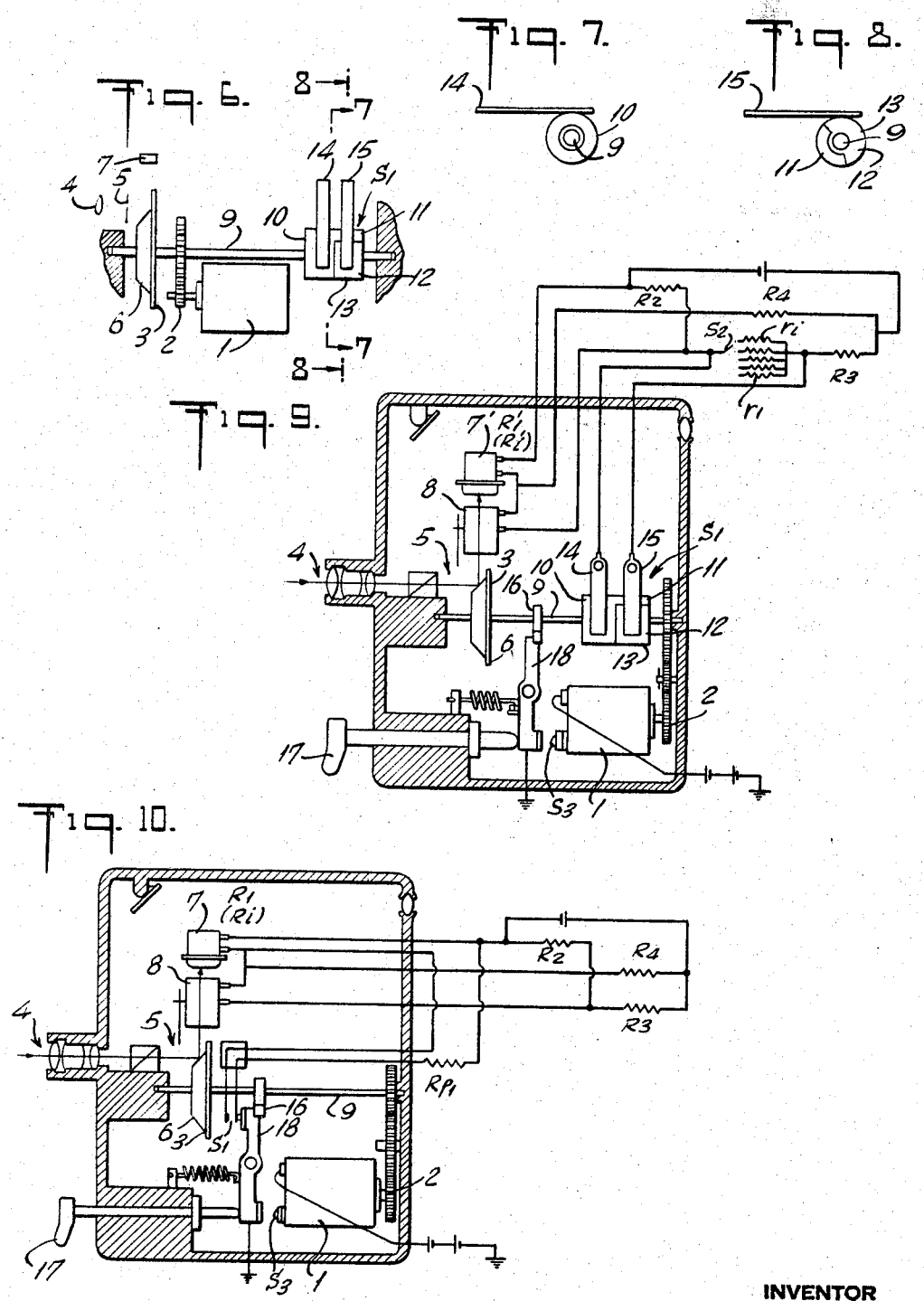

United States Patent Office 3,421,812
Patented Jan. 14, 1969

3,421,812
AUTOMATIC EXPOSURE CONTROL MOTION PICTURE CAMERA

Isamu Kubota, Sakai-shi, Osaka, Japan, assignor to Minolta Camera Company Ltd., Osaka, Japan, a corporation of Japan
Filed Feb. 24, 1966, Ser. No. 529,813
U.S. Cl. 352—141
Int. Cl. G03b 7/08
7 Claims

ABSTRACT OF THE DISCLOSURE

A motion picture camera includes a photoconductor and a shutter which directs the light entering the objective during the shutter closed position to the photoconductor. The photoconductor forms one leg of a closed bridge, first opposite corners of which are connected to a battery and the other corners of which are connected to an automatic diaphragm control meter movement which regulates the light through the objective. A compensating resistor is connected in one of the bridge legs through a switch which is open and closed with the actuation and deactuation of the shutter so that the diaphragm opening is independent of the actuation or deactuation of the shutter.

---

The present invention relates generally to improvements in motion picture cameras and it relates particularly to an improved motion picture camera having a light responsive automatic exposure control.

It has been conventional in photographic cameras both of the still and motion picture type to automatically control the diaphragm opening in response to the light passing through the camera main objective. The mechanism of the present invention is of the character wherein a photosensitive element is intermittently exposed to the objective traversing light during those periods when the light directed toward the film is intercepted by the shutter and the film is advanced to provide a current or indication for controlling the diaphragm opening. The photosensitive element may be exposed to the objective transmitting light during the shutter closed period by mounting the photosensitive element upon the face of the moving shutter directed toward the objective, by the use of a light reflecting mirror on the shutter which reflects the light to the photosensitive element during the shutter closed interval or by other arrangements whereby the light passing through the objective during the film exposure interval is not intercepted or attenuated for control or indication purposes so that the exposure procedure for control or indication purposes that the exposure procedure is not interfered with. While the aforesaid type of control mechanism possesses numerous desirable features it generally possesses an important disadvantage in that the total average light directed onto the photosensitive element during the photography sequence and during an inactive period under the same incident light conditions are different with consequent undesirable results. Although mechanisms have been suggested for overcoming the aforesaid drawbacks these possess many disadvantages.

It is, therefore, a principal object of the present invention to provide an improved automatic exposure camera.

Another object of the present invention is to provide an improved motion picture camera provided with a diaphragm automatically controlled in response to light passing through the objective light.

Still another object of the present invention is to provide an improved motion picture camera of the type in which a diaphragm is controlled by the objective transmitted light intermittently directed upon a photosensitive element during the shutter closure intervals of a photography sequence wherein the effected light indication or control is the same under the aforesaid photography sequence or under inactive conditions and under the same camera incident light conditions.

A further object of the present invention is to provide an automatic diaphragm motion picture camera of the above nature characterized by its flexibility, adaptability, simplicity and reliability.

The above and other objects of the present invention will become apparent from a reading of the following description taken in conjunction with the accompanying drawings, wherein:

FIGURE 6 is a diagrammatic view of a shutter diaphragm and rotary switch employed in the camera embodying the present invention;

FIGURE 7 is a sectional view taken along line 7—7 in FIGURE 6;

FIGURE 8 is a sectional view taken along line 8—8 in FIGURE 6;

FIGURE 9 is a sectional and schematic view of a camera embodying the present invention and employing the network of FIG. 2; and FIGURE 10 is a sectional and schematic view of another camera embodying the present invention.

Figure 1A:
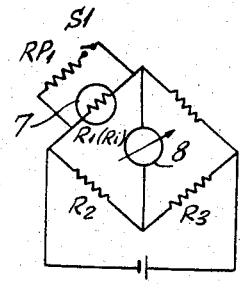
FIGURES 1a to 1d are circuit diagrams of control networks in accordance with the present invention.

In a sense, the present invention contemplates the provision of an automatic exposure motion picture camera comprising a photosensitive element, an objective, a shutter, means actuated with said shutter for intermittently exposing said photosensitive element to light passing through said objective and for steadily exposing said photosensitive element to said light upon deactuation of said shutter, current actuated means, a network connected to said current actuated means and including said photosensitive element, and a compensating resistor, and switch means connecting said compensating resistor into said network and movable between first and second positions whereby the response of said current actuated means under similar light conditions incident on said camera is substantially the same when said shutter is actuated and deactuated. Advantageously the network is a bridge network and the photosensitive element is a photoconductor forming a leg of the bridge network and the compensating resistor and switch are positioned in a leg of the bridge, either across the photoconductor or in another bridge leg. The current responsive device is advantageously an electric current meter movement connected to opposite corners of the bridge network and mechanically controlling the camera diaphragm, the other corners of the bridge network being connected to a voltage source. The switch may be urged to opposite states with the actuation and deactuation of the camera shutter or may be in one state with the deactuation of the shutter and synchronously periodically switched with the operating shutter.

Referring now to FIGURE 6 to 9 of the drawing which illustrates a basic form of camera which may employ the control network hereinafter described in accordance with the present invention, the reference numeral 4 generally designates the camera objective having associated therewith a diaphragm 5. The opening of diaphragm 5 is automatically adjusted by a meter device 8 controlled and energized by a bridge network including a photoconductor 7 or 7' to which light from the objective 4 is directed by a rotating shutter vane 3 positioned behind the diaphragm 5 and provided with a frustoconical mirror 6 along the closed section of the vane 3 so that the light is reflected to photoconductor 7 only while the shutter is closed. The shutter 3 is mounted on a drive shaft 9 which is driven by a motor 1 through a gear train 2. A commutator is mounted on the shaft 9 and includes a section 10 conducting along the full periphery thereof and an axially offset section 13 including a conducting section 11 integral with the conducting section 10 and an insulating section 12 extending for a fraction of the periphery corresponding to and phased with the closed section of the shutter vane 3. Resilient brushes 14 and 15 engage the commutator sections 10 and 13 respectively and define therewith a switch S1 which is open during the shutter closed position and closed during the shutter open position, the shutter being closed and the switch open upon deactuation of the shutter and drive. It should be noted that the switch S1 may be otherwise operated with the actuation and deactuation of the shutter and may be continuously closed during actuation and open only during deactuation. Moreover, other arrangements may be employed for exposing the photoconductor 7 during the shutter closed position.

In order to assure the positioning of the shutter 3 in its closed condition and the switch S1 in its open position upon deactuation of the shutter a radial detent arm 16 is affixed to the shaft 9. A lever 18 is pivoted about the center thereof and is spring urged to a retracted position with its upper end in the path of the detent arm 16 to engage the detent arm 16 in the shutter closed switch open condition. The lever 18 is engaged at its lower end by a release plunger 17. Upon depression of the plunger 17 the lever 18 is swung from the path of the detent arm 16 and the lower end of the lever 18 which cooperates with an aligned contact to define a switch S3 is swung into engagement with the contact to close the switch S3 and connect the drive motor 1 to a source of current and hence energize the same.

Though the light is transmitted to the photoelectric element 7 periodically and intermittently, due to the inertia of the photoelectric effect, no appreciable periodic variation is recognized in the resistance of said element. A constant resistance higher than that given when the shutter vane (3) is at rest is effected. The slight residual periodic variation is absorbed by the inertia of the exposure meter 8, and the indication value becomes constant.

Accordingly, it is highly desirable to correct the difference of the photoelectric effects produced when the shutter vane 3 is at rest and the photoconductor 7 uninterruptedly exposed and when it is rotating. To achieve this correction, a bridge network as shown in any of FIGURES 1a, b, c, and d may be employed in which a resistance $Rp_1$, $Rp_2$, $Rp_3$ and $Rp_4$ respectively is connected through a switch $S_1$ across the photoelectric element 7 or across a resistor $R_2$, $R_3$ and $R_4$ as shown in FIGURES 1a, b, c and d, the photoconductor 7 and resistors $R_2$, $R_3$ and $R_4$ forming the legs of the bridge network. When the shutter vane 3 is at rest, switch $S_1$ is opened, and when it begins rotating, closed. Referring to FIGURE 1a, assuming that the resistance $R_1$ of the photoelectric element 7 becomes $R_i$ when the shutter vane 3 is rotating, and the switch $S_1$ is closed during the rotation, the following equations are obtained from the characteristics of the bridge circuit:

$$R_1R_3 = R_2R_4$$

$$\left(\frac{RiRp_1}{Ri+Rp_1}\right)R_3 = R_2R_4$$

$$Rp_1 = \frac{R_1Ri}{Ri-R_1} \qquad (1)$$

Figure 1D:
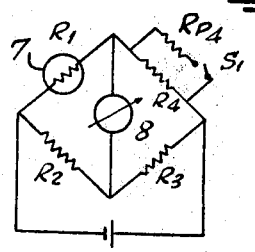
Figure 1C:
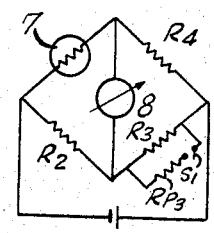
Figure 1B:
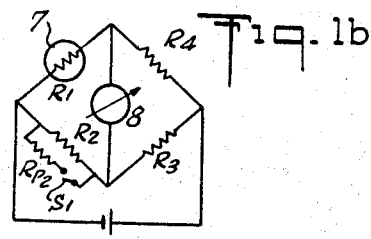

Thus, the value given by Equation 1 is chosen for the parallel resistance $Rp_1$, irrespective of whether while resting or when rotating, and the circuit current is always constant when the outside light intensity is constant, and the pointer of the exposure meter 8 is kept in balance in that position. The same applies with the networks of FIGURES 1b, 1c, and 1d. In such bridge circuits, the light passing through the diaphragm opening controlled by the rotation of the exposure meter, or a diaphragm opening formed by the diaphragm vane having other power and controlled by the instruction thereof, is directed to the photoelectric element. Therefore, if the film sensitivity, the shutter speed, and other exposure controlling factors are constant, the resistance R1 ($Ri$) of the photoconductor 7 is always constant irrespective of the size of the diaphragm opening. In cases where such factors as the film sensitivity and the shutter speed are changed, the intensity of the light directed to the photoconductor 7 is preferably controlled with filter or the like. The motor or meter 8 is connected between one pair of opposite bridge corners and a voltage source across the other corners.

Figure 2:
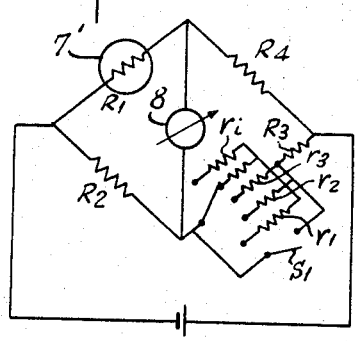
FIGURE 2 is a circuit diagram of another form of control network.
Figure 3:
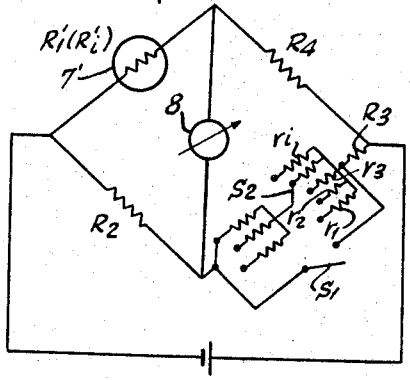
FIGURE 3 is a circuit diagram of still another form of control network.
Figure 4:
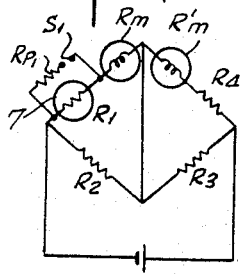
FIGURE 4 is a circuit diagram of a further form of control network.

Another basic form of control bridge network is shown by way of example in FIGURE 2, wherein one of the bridge legs, that including the resistor $R_3$, opposite the photoconductor 4 or 7, includes a plurality of resistors $r_1, r_2, r_3 \ldots r_i$ which are individually selectively connected by a multitap switch in series with the resistor $R_3$ to define the bridge leg, and the switch $S_1$ is connected across the network including the switch $S_2$ and the resistors $r_1, r_2, r_3 \ldots r_i$; the photoconductor 7' having resistance $R'_1$ at the time of shutter rest, and resistance $R'_i$ when the shutter is rotating, whereby a controlling device is provided for effecting an excess or lack of exposure for the purpose of correcting the film sensitivity, the shutter speed and the counter-light, and a bridge circuit consisting of other circuit resistor legs $R_2$ and $R_4$ and the exposure meter 8, which controls the opening of diaphragm 5, is provided. In another embodiment, as in FIGURE 3, in the bridge circuit, the parallel resistances are provided in two sets as contrasted to the single set of the network of FIGURE 2, one row effecting the shutter speed change, and the other the film sensitivity change. In still another embodiment, as shown in FIGURE 4, a double coil meter is employed in which the movable coil of the exposure meter is divided into two series connected sections $R_m$ and $R'_m$. Section $R_m$ is connected in series with photoconductor 7 to form one leg and section $R'_m$ is connected in series with resistor $R_4$ to form an adjacent leg, the photoconductor being shunted by series connected resistor $Rp_1$ and switch $S_1$.

In the operation of the arrangement shown in FIGURES 6 to 9, the motor 1 is started by means of the plunger 17, and the shutter driving shaft 9 rotates, and as the plunger is released, the shutter shaft 9 is always stopped at a fixed position by the stopper 16. While the brush 14 of the rotary switch always engages the electric conducting section 10, irrespective of whether during rotation or resting, the brush 15 engages insulating part 12 only during rest, and, during rotation, the insulating part 12 and the electric conducting part 11 are alternatively successively engaged. Between the brushes 14 and 15, the circuit is open while the shutter shaft is at rest, and, during rotation, closing is periodically and intermittently repeated. By use of such an arrangement, in the parallel circuit of $Rp$ shown in FIGURE 1, an intermittent current flows and the resistance $Rp_1$ of Equation 1 gives the effective value. Therefore, the actual resistance is required to be made lower by that amount through correction. Referring to FIGURES 2 and 10, if the switch $S_2$ is generally closed to the parallel resistance $r_1$, and when the shutter vane is at rest:

$$R'_1(r_1+R_3)=R_2R_4 \quad (2)$$

Figure 5:
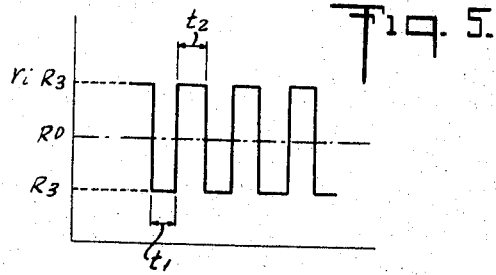
FIGURE 5 is a graph illustrating the variation in resistance of a section of a control network during the camera shutter operation with a rotary switch.

On the other hand, during rotation, the switch $S_1$ periodically repeats the on-and-off movement, and, therefore, when it is open, the total resistance on the opposite side to the photoelectric element is $r_1+R_3$, and when it is closed, the resistance becomes $R_3$. This switching is rapidly repeated, and, as a result, the apparent total resistance of this circuit, when the shutter is in rotation, is represented by, for example, $R_o$ as the effective value. FIGURE 5 is a graph indicating this condition, where the resistance is taken on the ordinate and the time on the abscissa. Here, $R_o$ depends not only on $R_3$ and $r_1$ but also on $t_1$, the time when the switch $S_1$ is opened and on $t_2$, the time when it is closed, and, therefore, it may be arbitrarily set by making proper choice of these values. Accordingly, it is apparent, that the ratio of the total resistance $(r_1+R_3)$ at the time of the shutter resting to $R_o$ may be arbitrarily chosen. At the time of the shutter rotating, the equation:

$$R'_1R_o=R_2R_4 \quad (3)$$

is established, and, from the Equations 2 and 3, the equation:

$$\frac{R'_1}{R'i}=\frac{R_o}{(r_i+R_3)} \quad (4)$$

follows. Choosing $R_o$ and $r_1$ which satisfy the above equation may be effected in accordance with the above description. The numerator and the denominator on the right side of Equation 4 are, respectively, the first order function of $r_1$. If $R_3$ and $t_1$, $t_2$ are properly chosen, only one value that satisfied the Equation 4 is determined for $r_1$.

Referring to FIGURE 10, there is shown a camera employing a switch of another type, and incorporating the bridge of FIGURE 1a. Specifically, the stopper detent arm 16 mounted on the shutter driving shaft 9 engages the upper part of spring urged lever 18, controlled by the plunger 17, the lower part of said lever 18 being used as the switch of the motor 1 as in the arrangement of FIGURE 9. When the plunger 17 is pushed, the switch lever 18 turns counter-clockwise, relating the detent arm 16, and, then, closing the switch $S_1$ which is in its path and the motor switch $S_3$. When the plunger 17 is released, the switch lever 18 turns clockwise, opening both switches $S_1$ and $S_3$, and, at the same time, the upper part thereof enters the path of the arm 16, and is engaged therewith to stop the shutter 3.

The present invention thus provides an exposure controlling device of a type in which, with a bridge circuit having the above described characteristics the photoelectric element is illuminated by effectively utilizing the conventionally wasted intermittent light energy at the time of non-exposure during the film frame feed. To make further the correction that is provided by the effect of inertia of the photoelectric element and the effect of the inertia of the exposure meter, the correction circuit placed parallel to a resistance of the bridge circuit, a plurality of parallel resistances connected in series with the circuit resistance on the opposite side to the photoelectric element, or the switch for said circuit or for the circuit on the opposite side to the photoelectric element, are correlated to the driving shaft or the release switch lever. In this way, even if the ratio of the resistances $R_1$, $R_i$ of the photoelectric element at the time of rest and during rotation is not constant with individual photoelectric elements, by setting the resistance $Rp_1$ at the value given by the above Equation 1, and although the ratio of the resistances $R'_1$, $R'_1$ of the photoelectric element is likewise not constant with individual photoelectric elements, and this ratio changes as the intensity of illumination is changed by the switching of the circuit resistance as shown in FIGURE 2; by choosing an appropriate value for the resistance $r_1$ given in Equation 3, and by installing a simple switch, the offsetting operation of the exposure meter due to intermittent light energy is completely corrected, whereby the defect in the matter of photoelectric effect arising from the difference between the effect at the time of rest of the motion picture camera and when it is rotating is eliminated. The construction of the present device is simple and its application is wide and easily implemented.

While there have been described and illustrated preferred embodiments of the present invention, it is apparent that numerous alterations, omissions and additions may be made without departing from the spirit thereof.

What is claimed is:

1. An automatic exposure motion picture camera comprising a photoconductor, an objective, a shutter, means for driving said shutter, means actuated with said shutter for intermittently exposing said photoconductor to light passing through said objective and steadily exposing said photoconductor to said light upon deactuation of said shutter, an adjustable diaphragm disposed in the path of light passing through said objective, a current meter having a moving element coupled to said diaphragm and controlling the opening thereof, a battery, a closed bridge network including said photoconductor in a leg thereof and first and second pairs of opposite corners connected to said battery and said meter respectively, a compensating resistor, means including a switch movable between first and second position for connecting said compensating resistor into a leg of said bridge network, selectively controlled means for actuating said drive means, and means responsive to said drive actuating means for actuating said switch whereby the response of said diaphragm under similar light conditions incident on said camera is substantially the same when said shutter is actuated and deactuated.

2. The camera of claim 1 wherein said meter comprises a dual winding moving coil and said network comprises a bridge network, said coil windings being located in different legs of said bridge network and said photoconductor is located in one leg of said bridge network and said compensating resistor and said switch are located in a leg of said bridge network.

3. The camera of claim 1 wherein said compensating resistor and switch are connected in series across said photoconductor.

4. The camera of claim 1 wherein said photoconductor is located in one leg of said bridge network and said compensating resistor and switch are connected in series in another leg of said bridge.

5. The camera of claim 1 wherein said photoconductor is located in one leg of said bridge and a first bridge resistor is located in another leg of said bridge, said compensating resistor and switch being connected in series across said first bridge resistor.

6. The camera of claim 1 wherein said photoconductor is located in one leg of said bridge network and another leg of said bridge network includes a first bridge resistor and a selectively adjustable variable resistance network connected in series therewith, said switch being connected across said variable resistance network.

7. The camera of claim 1 wherein said switch is actuated in synchronism with the opening and closing of said shutter.

References Cited

UNITED STATES PATENTS

| | | | |
|---|---|---|---|
| 3,124,033 | 3/1964 | Freudenschuss | 352—141 |
| 3,176,312 | 3/1965 | Reinsch | 352—141 |
| 3,188,935 | 6/1965 | Lieser et al. | 352—141 XR |
| 3,227,056 | 1/1966 | Lieser | 95—10 |
| 3,275,399 | 9/1966 | Johnson | 352—141 |
| 3,363,967 | 1/1968 | Schmitt | 95—10 XR |

JOHN M. HORAN, *Primary Examiner.*

J. F. PETERS, JR., *Assistant Examiner.*

U.S. Cl. X.R.

95—10, 64